United States Patent
Boyle

(10) Patent No.: US 12,035,699 B2
(45) Date of Patent: Jul. 16, 2024

(54) SINGLE-SEED SHELLFISH FLOATING AQUACULTURE SYSTEM

(71) Applicant: ZAPCO INTERNATIONAL LIMITED, Hong Kong (CN)

(72) Inventor: Peter James Boyle, Hong Kong (CN)

(73) Assignee: ZAPCO INTERNATIONAL LIMITED, Hong Kong (CN)

( * ) Notice: Subject to any disclaimer, the term of this patent is extended or adjusted under 35 U.S.C. 154(b) by 159 days.

(21) Appl. No.: 17/627,806

(22) PCT Filed: Jul. 29, 2019

(86) PCT No.: PCT/CN2019/098123
§ 371 (c)(1),
(2) Date: Jan. 17, 2022

(87) PCT Pub. No.: WO2021/007885
PCT Pub. Date: Jan. 21, 2021

(65) Prior Publication Data
US 2022/0256817 A1    Aug. 18, 2022

(30) Foreign Application Priority Data

Jul. 17, 2019 (CN) .......................... 201910645918.4

(51) Int. Cl.
*A01K 61/60* (2017.01)
*A01K 61/50* (2017.01)

(52) U.S. Cl.
CPC .............. *A01K 61/60* (2017.01); *A01K 61/50* (2017.01)

(58) Field of Classification Search
CPC ........ A01K 61/60; A01K 61/50; A01K 61/54; A01K 61/59; A01K 61/65; A01K 61/51;
(Continued)

(56) References Cited

U.S. PATENT DOCUMENTS

| 5,329,719 A * | 7/1994 | Holyoak ................ A01K 61/60 |
| | | 43/6.5 |
| 2008/0257275 A1* | 10/2008 | Labra Reynolds .... A01K 61/59 |
| | | 119/213 |

(Continued)

FOREIGN PATENT DOCUMENTS

| AU | 2012101928 A4 * | 6/2015 |
| CN | 1104840 | 7/1995 |

(Continued)

OTHER PUBLICATIONS

"International Search Report (Form PCT/ISA/210) of PCT/CN2019/098123," mailed on Apr. 1, 2020, with English translation thereof, pp. 1-6.

(Continued)

*Primary Examiner* — Joshua J Michener
*Assistant Examiner* — Nicole Paige Maccrate
(74) *Attorney, Agent, or Firm* — JCIPRNET

(57) ABSTRACT

A single-seed shellfish floating aquaculture system includes rack bodies, mesh bags, and floats cooperating with each other. The rack bodies, the mesh bags and the floats are of a split structure and can be assembled into a whole. The rack bodies are made of corrosion resistant and rust resistant materials and assembled from a group of detachable flat-shaped structural members, a plurality of accommodation spaces are formed in the assembled rack bodies, the mesh bags are provided within the accommodation spaces, the floats are fixed on the rack bodies, and the single shellfish seedlings are directly put into the mesh bags to achieve single shellfish farming.

12 Claims, 16 Drawing Sheets

(58) Field of Classification Search
CPC ........ A01K 61/53; A01K 61/55; A01K 61/56; A01K 61/57; Y02A 40/81
See application file for complete search history.

(56) References Cited

U.S. PATENT DOCUMENTS

| | | | | |
|---|---|---|---|---|
| 2017/0027136 | A1* | 2/2017 | Newell | A01K 61/60 |
| 2017/0245479 | A1* | 8/2017 | DePaola | A01K 61/50 |
| 2019/0116767 | A1* | 4/2019 | DePaola | A01K 61/60 |
| 2019/0200582 | A1* | 7/2019 | Horzesky | A01K 61/50 |

FOREIGN PATENT DOCUMENTS

| | | |
|---|---|---|
| CN | 101406162 | 4/2009 |
| CN | 101525574 | 9/2009 |
| CN | 102524129 | 7/2012 |
| CN | 202374876 | 8/2012 |
| CN | 202444966 | 9/2012 |
| CN | 103348945 | 10/2013 |
| CN | 104067960 | 10/2014 |
| CN | 104365511 | 2/2015 |
| CN | 105475189 | 4/2016 |
| CN | 106417130 | 2/2017 |
| CN | 206576068 | 10/2017 |
| CN | 206760458 | 12/2017 |
| CN | 108029606 | 5/2018 |
| CN | 208286188 | 12/2018 |
| CN | 210432651 | 5/2020 |
| SU | 1242081 | 7/1986 |
| WO | 0152637 | 7/2001 |

OTHER PUBLICATIONS

"Office Action of China Counterpart Application" with English translation thereof, issued on Jan. 6, 2021, p. 1-p. 13.
"Office Action of China Counterpart Application" with English translation thereof, issued on Jul. 29, 2021, p. 1-p. 7.

* cited by examiner ered by a rope
SINGLE-SEED SHELLFISH FLOATING AQUACULTURE SYSTEM

CROSS-REFERENCE TO RELATED APPLICATION

This application is a 371 of international application of PCT application serial no. PCT/CN2019/098123, filed on Jul. 29, 2019 which claims the priority benefit of China application no. 201910645918.4, filed on Jul. 17, 2019. The entirety of each of the above mentioned patent applications is hereby incorporated by reference herein and made a part of this specification.

TECHNICAL FIELD

The invention relates to the technical field of aquaculture, and relates to a single-seed shellfish floating aquaculture system with a simple structure and convenient transportation, installation, and storage.

DESCRIPTION OF RELATED ART

In an aquaculture cage structure in the prior art, such as the steel-structure net cage described in the China application serial no. 201611038112.1, or a structure with net cages in the lower part and airbags in the upper part and a rope between the net cages adopted to tie the net cages together, there are disadvantages to the structures of the prior art as follows.
1. Net cages are generally of metal structure and are subject to corrosion in seawater, which affects the service life of the net cages and the quality of the aquaculture products.
2. The built-in mesh bags are made of metal inside and plastic outside. The outer layer of plastic may fall off, and the inner layer of metal may be directly exposed to seawater and subject to corrosion over time, which may also affect the quality of the products and reduce the service life of the mesh bags.
3. The net cages float on the sea surface through the action of the airbags in the upper part. Due to the high height of the airbags, a certain degree of visual pollution is caused.
4. As the air volume of the airbags cannot be adjusted, the net cages can only be configured to float at a fixed height for aquaculture, and it is not likely to select an optimal height for aquaculture according to the requirements of the aquaculture products.
5. There is no space for movement between a net cage and a mesh bag. When sea waves crash, the aquaculture products may be crashed to be unevenly distributed and even be washed to the corners of the mesh bag, resulting in death of some products since the products are squeezed in the lower part and unable to get enough food, which affects the yield rate.
6. The net cage and the mesh bag are an integrated structure and cannot be disassembled, which is inconvenient for storage and transportation and greatly increases storage and transportation costs.
7. Currently, on the market, products come with airbags are without valves, and the floats are just sealed with lids, leading to inability to adjust air volume and probability to lose the lids after being unscrewed.
8. The net cages are connected by a rope. When the wind is strong and waves are huge, the rope is likely to break, and the net cages are scattered and washed away by the wind and waves, causing product loss.
9. The adaptability of the net cages and the mesh bags is poor. They can only be used as a set but cannot be used in cooperation with common mesh bags on the market, which increases the cost.
10. The net cages and the mesh bags are a fixed structure. When the aquaculture products are taken out, it requires to drag the entire net cages to the ship, open the net cages, take out the products, and reassemble the net cages and the mesh bags one by one in advance for reuse. This operation is cumbersome.
11. Since the airbag structure has a greater height, the height from the top to the bottom of the airbag is generally at least 1 meter, and when the wind is strong and waves are huge, the airbags are crashed first and then the net cages, which makes the net cages easy to tilt and crashes the aquaculture products to be unevenly distributed and even washed to the corners of the mesh bags, resulting in death of some products since the products are squeezed in the lower part and unable to get enough food, which affects the yield rate. Meanwhile, if the net cages are not sunk into the sea in time, the net cages may prone to damage.
12. The airbag and the net cage are connected by a rope or a tie, which is easy to loosen. When the wind is strong and waves are huge, the rope may break and the net cage and the airbag are disconnected and washed away by the wind and waves, causing product loss.
13. When the aquaculture products are unevenly distributed, for one thing, the mortality rate of the products is increased, and for another thing, the products cannot be polished into a bright and orderly condition, which may affect the plump appearance of the shellfish meat.

SUMMARY

Regarding the defects in the prior art, the invention provides a single-seed shellfish floating aquaculture system, which not only has a simple structure but is convenient in transportation, installation, and storage and meanwhile ensures the quality of products and prolongs the service life of net cages and mesh bags.

To achieve the objective, the technical solution of the invention is illustrated as follows.

A single-seed shellfish floating aquaculture system includes rack bodies, mesh bags, and floats cooperating with one another. The rack bodies, the mesh bags, and the floats are split structures, and are able to be assembled into a whole. Each of the rack bodies is made of corrosion resistant and rust resistant materials, each of the rack bodies is assembled from a group of detachable flat-shaped structural members, a plurality of accommodation spaces are formed in each of the assembled rack bodies, the mesh bags are disposed within the accommodation spaces, the floats are fixed on each of the rack bodies, and single shellfish seedlings are adapted to be directly put into the mesh bags to achieve single shellfish farming.

Further, each of the floats is an airbag or blown-molded float.

Further, flow spaces are provided in each of the rack bodies.

Further, a number of the mesh bags are provided, the mesh bags are disposed and fixed in the accommodation spaces of the rack bodies, a movement space is reserved between the adjacent mesh bags, and the mesh bags are disposed in a fixed or movable manner.

Further, the mesh bags are a pillow-type structure having a closed end and an open end, and two end portions of each of the mesh bags respectively include movement space to prevent shellfish from getting stuck in the end portions.

Further, each of the mesh bags is a movable independent structure, the mesh bags are respectively disposed into the accommodation spaces of each of the rack bodies, and are respectively positioned by a pull rod member.

Further, each of the mesh bags is a movable independent structure, the mesh bags are respectively disposed into the accommodation spaces of each of the rack bodies, and are fixed to each of the rack bodies by fixing members.

Further, the airbag is a flat-shaped structure, valves are respectively disposed on two ends of the airbags, an adjusting structure is disposed on each valve to adjust an air volume in the airbag, the adjusting structure is an adjusting knob buckled with the valve without falling off, and the air volume in the airbag is able to be adjusted by turning the adjusting knob.

Further, each of the flat-shaped structural members of the rack body includes two end supporting pieces and a group of middle supporting pieces in cooperation with a group of connecting poles and nuts, connecting holes are disposed on each two end supporting pieces, clamping grooves are disposed on each middle supporting piece, each connecting pole is clamped into the clamping grooves of the middle supporting pieces, and two ends of each connecting poles are respectively fixed to the two end supporting pieces by the nuts in an easy-to-connect manner.

Further, an airbag bracket is disposed on each rack body, a first clamping point is formed on the rack body at a place where the rack body fits with the airbag, a second clamping point is disposed on the airbag bracket at a place where the airbag bracket fits with the airbag, the airbag is clamped between the first clamping point and the second clamping point to limit left and right movement of the airbag, a groove is disposed on the airbag, and a fixing member extending along the groove fixes the airbag to the rack body and the airbag bracket to limit upward and downward movement of the airbag.

Further, the rack bodies are flexibly connected by a connecting structure, the connecting structure includes connecting rods fixed on two sides of each rack body, a position-limiting groove is formed on each of the connecting rods, one end of a holding strap is connected within the position-limiting groove, and the other end of each holding strap is provided with a sleeve rod or a sleeve ring. The holding strap with the sleeve rod is disposed on one side of the rack body, the holding strap with the sleeve ring is disposed on the other side of one rack body, the sleeve ring on one side of the rack body is connected to the sleeve rod of another rack body, and the sleeve rod on the other side of the rack body is connected to a sleeve ring of a next rack body so that two adjacent rack bodies are flexibly connected.

Further, a group of connecting holes are formed on each of the connecting poles, and the holding straps penetrate the connecting holes and fix the mesh bags on the rack body.

Compared with the prior art, by adopting the technical solution, the invention has advantages as follows.

1. The rack bodies and members are made of corrosion resistant and rust resistant materials (e.g., plastic or aluminum alloy), which are not easy to corrode and prolong the service life to at least 20 years, in general.
2. The rack bodies are formed by splicing flat-shaped members through bolts and are disassembled into sheet-like stacks and multiple accessories when in transportation and in storage. The accessories can be put into the airbag without taking up spaces, and it is convenient for transportation and storage.
3. When the airbags have flat-shaped structures, the rack bodies sink under the water surface, and only a small part of the airbag is exposed above the water surface. Visual pollution is reduced, good stability is obtained, and the rack bodies are not easy to tilt.
4. The airbag and the valve can be made into an inseparable structure, the valve is not easy to lose, and the air volume of the airbag can be quickly adjusted through the valve, so that the net cage can float at the optimal height for aquaculture.
5. The mesh bag is a movable structure, which can be placed in a stack when in transportation. There are two options for configuring the structure according to requirements. In the first structure, the mesh bag is fixed to the rack body by the pull rod member and when the products are required to be taken out, by pulling the pull rod member, the mesh bag is taken out from the rack body and then the aquaculture products inside the mesh bag are poured out. In the second structure, the mesh bag is disposed and fixed to the rack body by the fixing member and when the products are required to be taken out, without removing the mesh bag, the aquaculture products inside the mesh bag are poured out by just opening all the mesh bags. The mesh bag has good adaptability and can replace the common mesh bags on the market.
6. There are movement spaces between the rack bodies and the mesh bags, and there are also flow spaces reserved in the rack bodies. The fluidity thereof can increase the content of algae in the mesh bag, ensuring that the mesh bags have movement spaces on the rack bodies when wind is strong and waves are huge, ensuring that the products of the mesh bag can be evenly distributed in the mesh bags at all times and are naturally washed by the waves to polish the appearance of the products, and ensuring that the meat of the products is fresh and delicious, the manual opening process of the shellfish is reduced, and the aquaculture cost is decreased.
7. The rack bodies are connected by a sleeve ring in cooperation with a sleeve rod in a firm manner and with good adaptability. Multiple rack bodies can be connected at will, which can replace the existing connecting ropes to ensure that the rack bodies can be flipped easily and are placed in the same water. In addition, the cooperation of the sleeve ring and the sleeve rod can reduce the friction of the fit, achieves quick disassembly and assembly, and is not prone to break.
8. The floats and the rack bodies are fixed by a positioning structure in a firm and stable manner without moving relative to each other.
9. The rack bodies of the invention can be flipped. When the sunshine is needed, the rack bodies can be flipped over, the rack bodies face upward, and the floats face downward, so that the mesh bags can be dried in time and attachments can be reduced.
10. The structure of the invention can achieve that it is already a single shellfish when being cultured in a mesh bag, and it is a single body from cultivation to maturity, achieving single shellfish aquaculture, and greatly improving the survival rate of the cultured products. When the cultured products are harvested, it requires only to take out the single shellfish in the mesh bag, reducing labor costs.

11. The flat-shaped structural members of the rack bodies are connected by connecting poles, the middle supporting pieces are clamped with the connecting poles through the clamping grooves, and the two end supporting pieces are locked and connected to the connecting poles by bolts. This structure is easy to disassemble, and the parts where the connecting poles are connected to the clamping grooves can increase the intensity.

12. The method for fixing the airbag adopts the connection method of the clamping point and the belt. The first clamping point and the second clamping point limit left and right movement of the airbag, and the belt limits upward and downward movement of the airbag. Fixation of the airbag by such cooperation of the clamping point and the belt is more stable and not easy to loosen.

13. When encountering extreme weather, by the structure of the invention, both valves at two ends of the airbag can be quickly open, so that the culture rack can quickly sink to a designated depth of the water, preventing the damage brought by wind and waves. In normal times, by adjusting the valves, the airbag air inflow and water inflow can be adjusted to implement the sinking of the culture rack to the designated depth of the water, which contributes to achieving the optimal water for aquaculture.

BRIEF DESCRIPTION OF THE DRAWINGS

The drawings described in the specification are used to provide a further understanding of the invention and constitute a part of the invention. The exemplary embodiments of the invention and the description thereof are used to explain the invention and do not constitute an improper limitation of the invention. Refer to the drawings.

DESCRIPTION OF THE EMBODIMENTS

Figure 1:
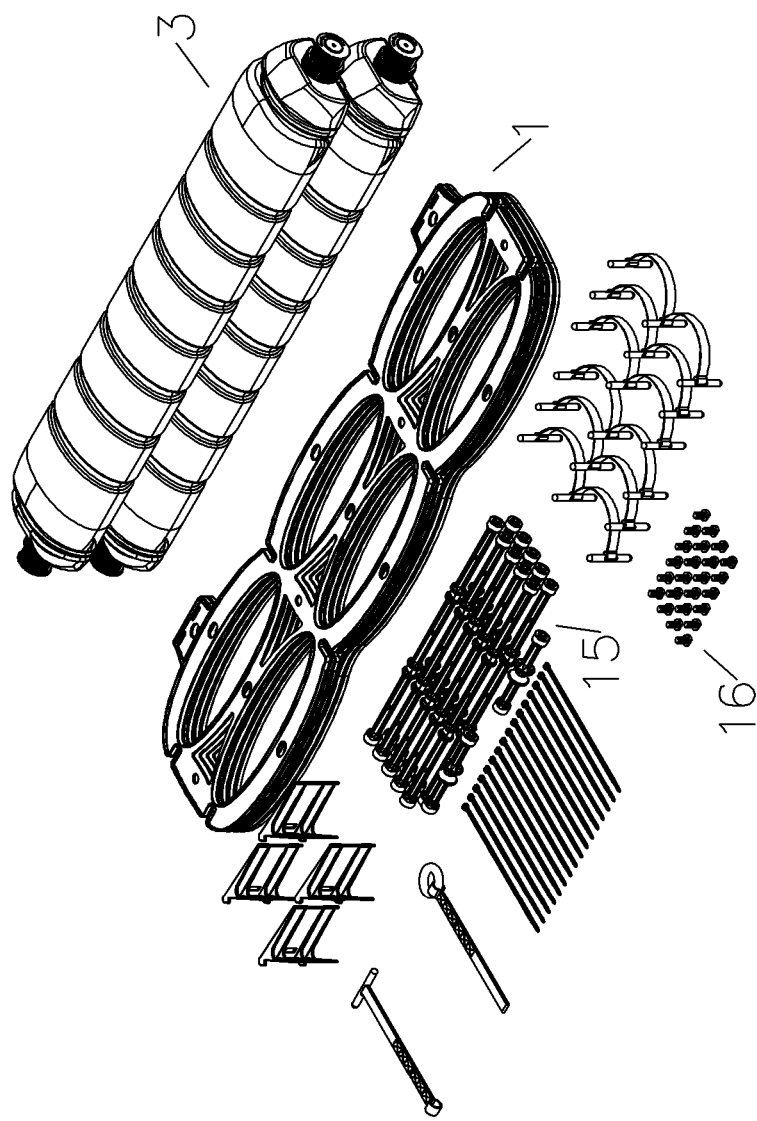
FIG. 1 is a schematic view of the invention after disassembly.
Figure 2:
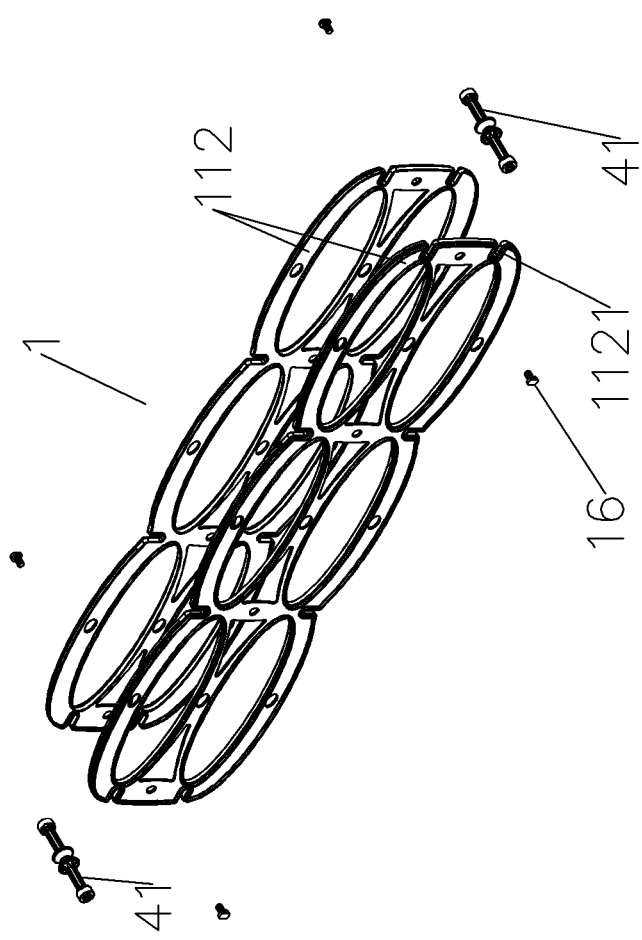
FIG. 2 is a first schematic view of the assembly of a rack body of the invention.
Figure 3:
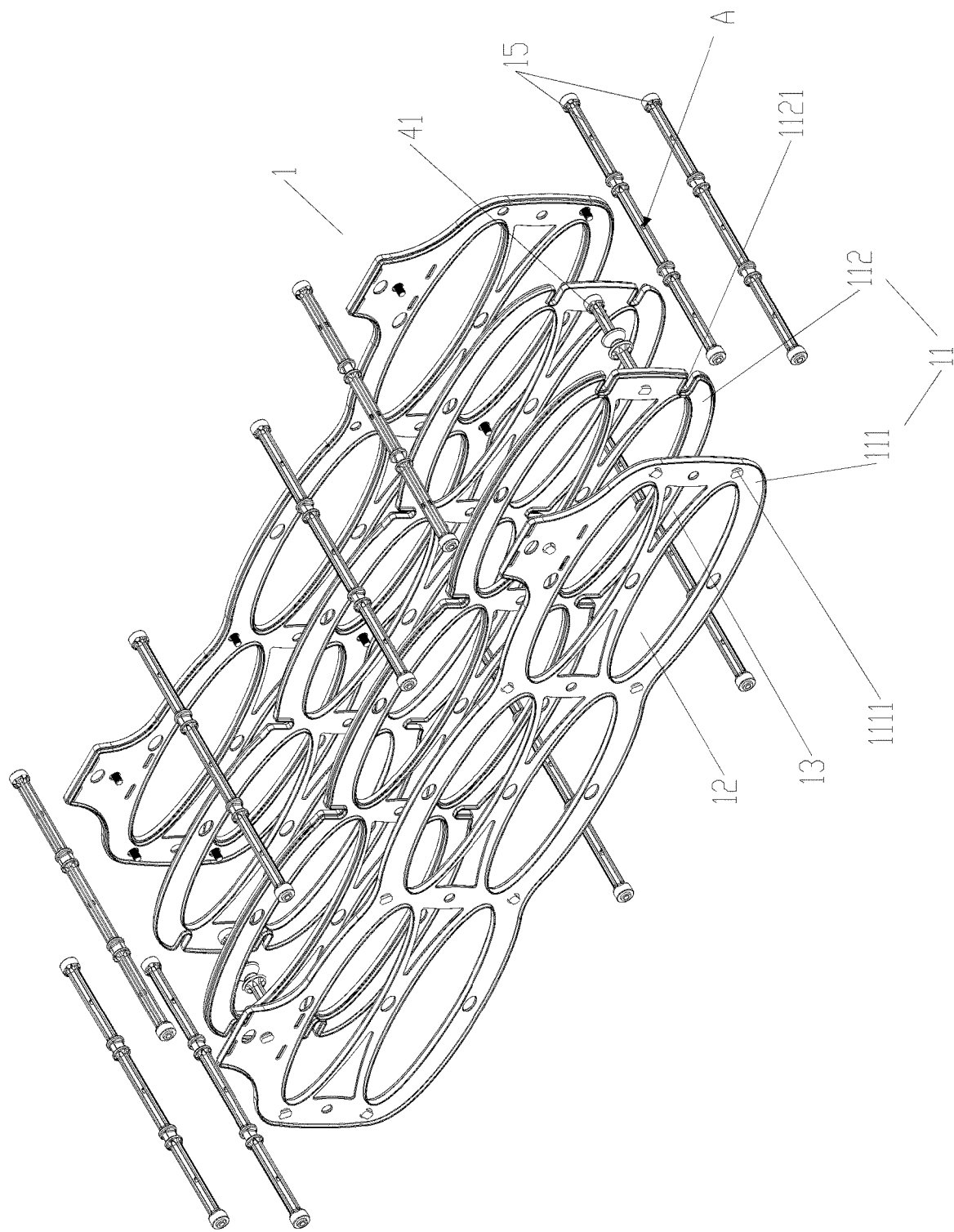
FIG. 3 is a second schematic view of the assembly of a rack body of the invention.
Figure 4:
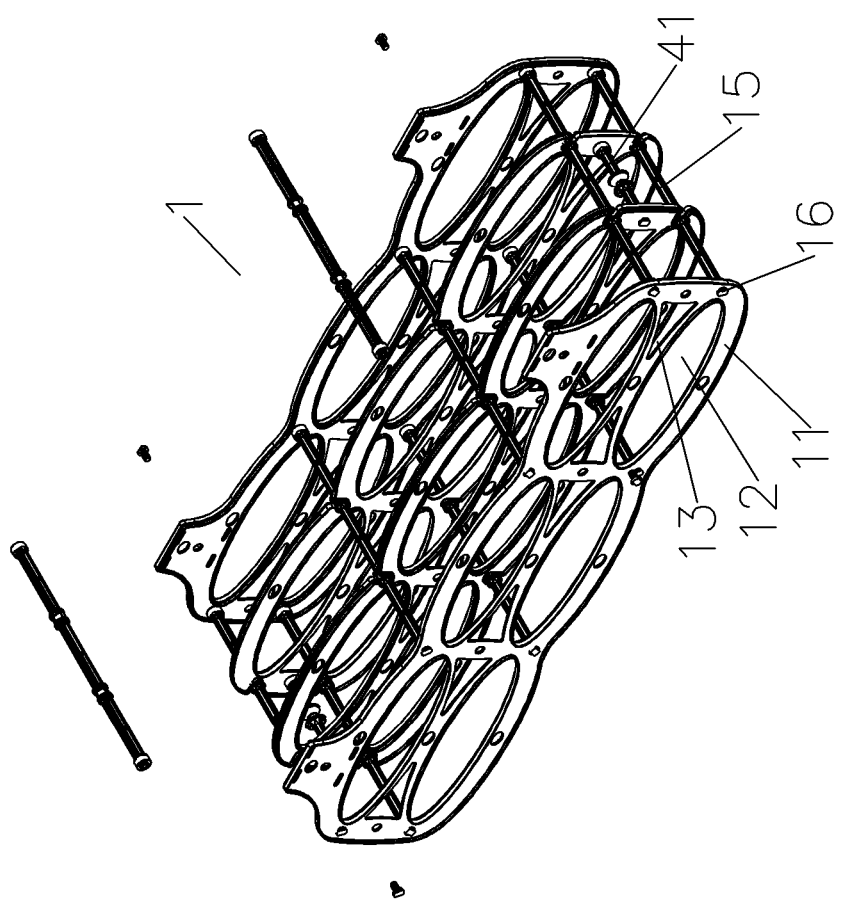
FIG. 4 is a third schematic view of the assembly of a rack body of the invention.
Figure 5:
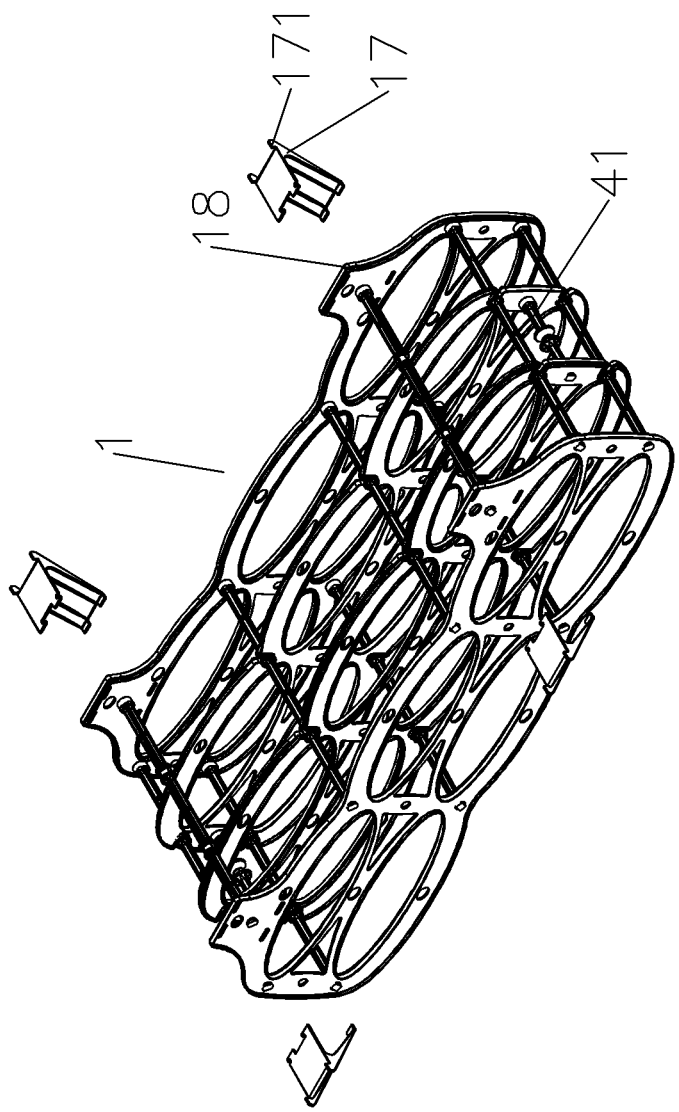
FIG. 5 is a fourth schematic view of the assembly of a rack body of the invention.
Figure 6:
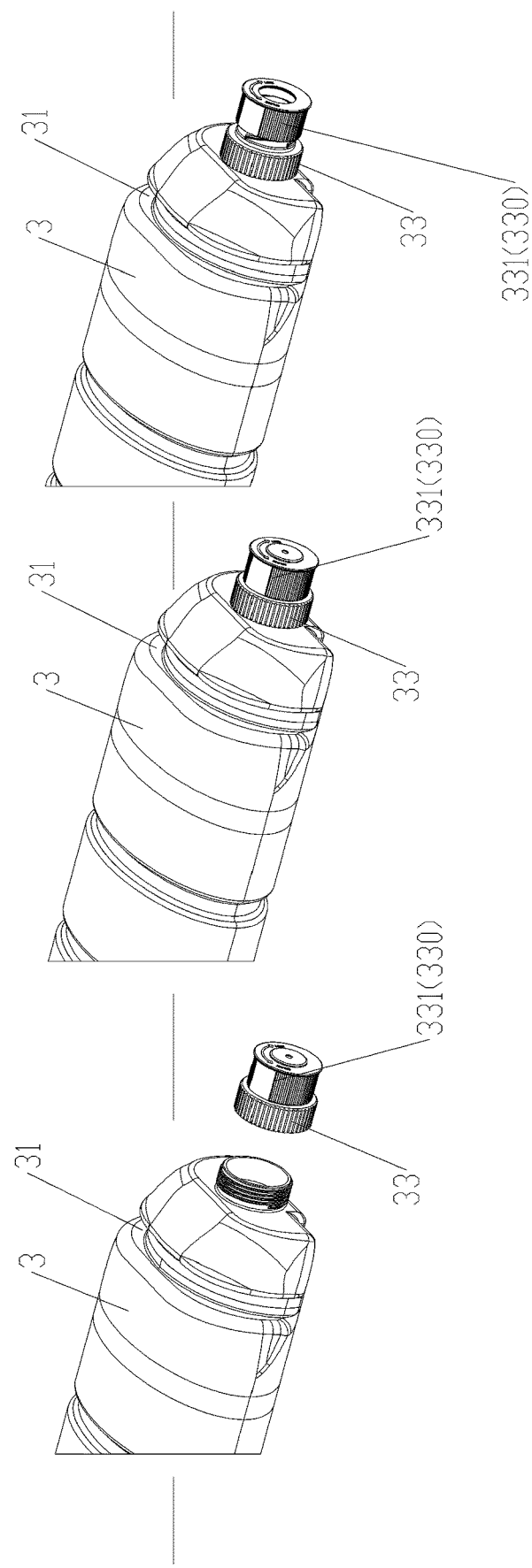
FIG. 6 is a first schematic view of disposing airbags on a rack body of the invention.
Figure 7:
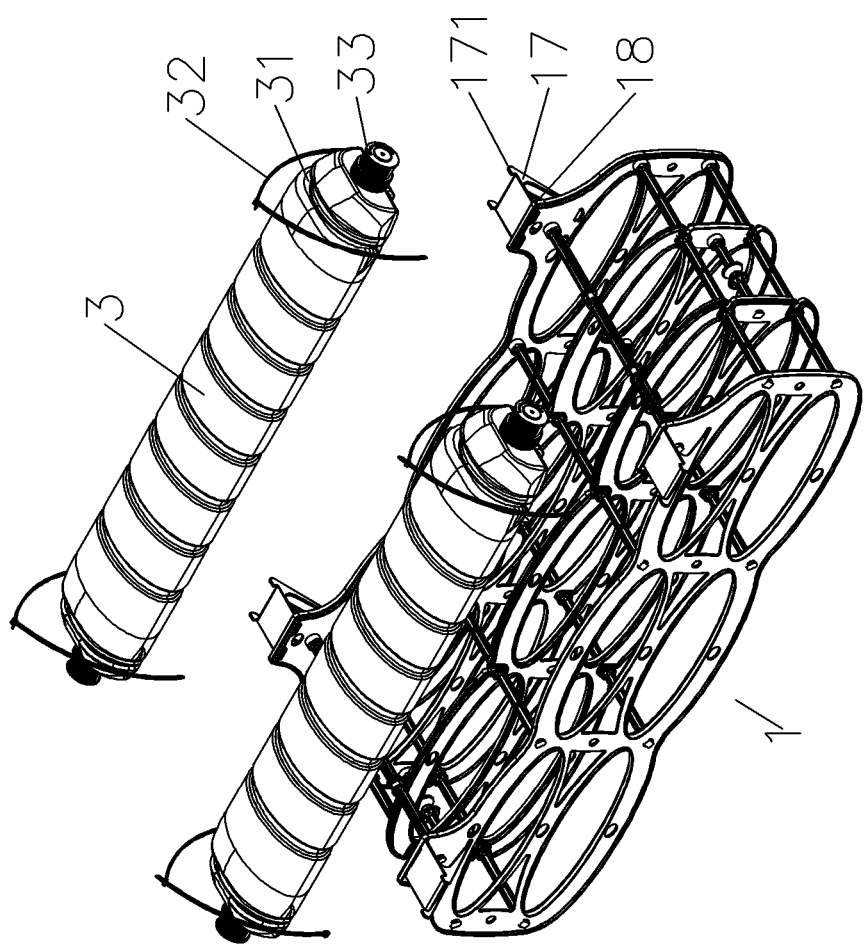
FIG. 7 is a second schematic view of disposing airbags on a rack body of the invention.
Figure 8:
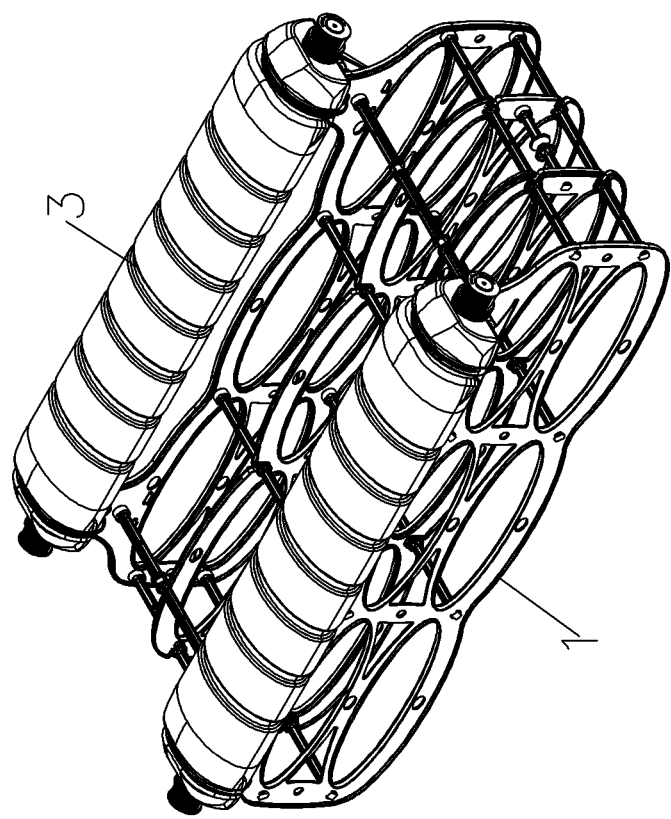
FIG. 8 is a third schematic view of disposing airbags on a rack body of the invention.
Figure 9:
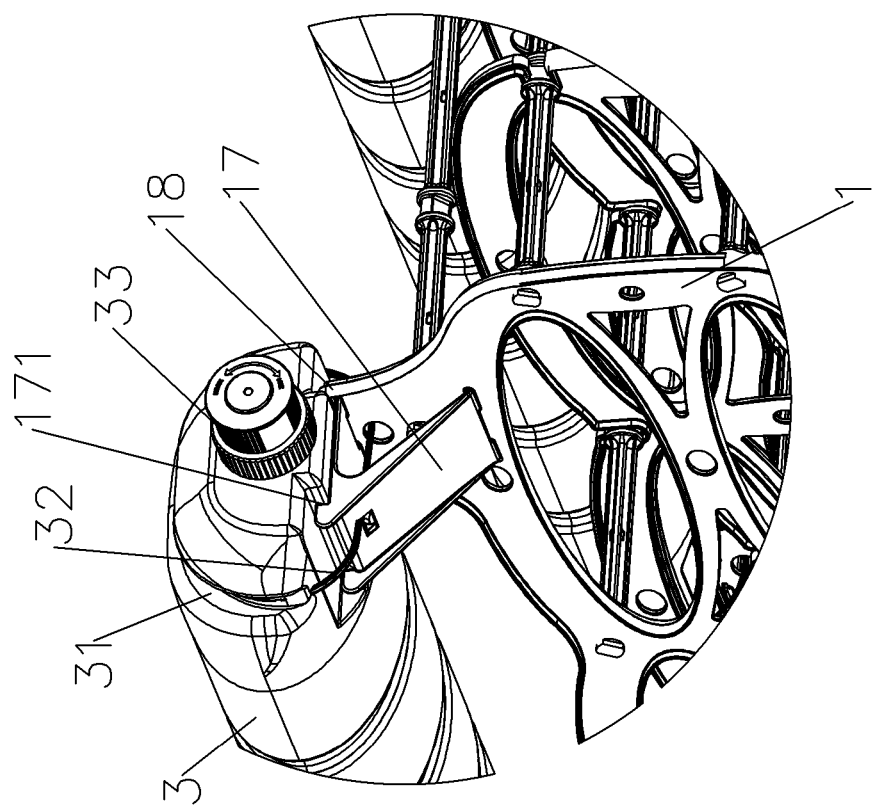
FIG. 9 is a fourth schematic view of disposing airbag son a rack body of the invention.

In order to make the technical problems to be solved by the invention, technical solutions, and beneficial effects clearer and more comprehensible, the invention is to be further illustrated in detail with reference to the accompanying drawings and embodiments in the specification. It should be understood that the specific embodiments described herein are only used to explain the invention and are not intended to limit the invention.

The embodiments of the invention are illustrated as shown in FIG. 1 to FIG. 16.

A single-seed shellfish floating aquaculture system includes rack bodies 1, mesh bags 2, floats 3 in cooperation with one another. The rack bodies 1, the mesh bags 2, and the floats 3 are each a split structure and can be assembled into a whole. Each of the rack bodies 1 are made of corrosion resistant material and assembled by a group of detachable flat-shaped structural members 11. Multiple accommodation spaces 12 are formed in each of the assembled rack bodies. The mesh bags 2 are movably disposed in the accommodation spaces 12, and the floats 3 are fixed on each of the rack bodies 1. Single shellfish seedlings are adapted to be put into the mesh bags directly to achieve the single shellfish farming.

In a specific embodiment, the floats 3 are airbags, blown-molded floats, or other buoyant carriers. Flow spaces 13 are made in the rack bodies 1.

When performing the assembly, as shown in FIG. 1, FIG. 1 is a view illustrating disassembled members, and FIG. 2 to FIG. 5 are views illustrating the assembly of a rack body. The rack body 1 includes a group of the detachable flat-shaped structural members 11 (implemented as plastic supporting pieces in the embodiment), a group of corrosion resistant material connecting poles 15 (implemented as marine-grade metal connecting poles in the embodiment), and corrosion resistant material nuts 16 (implemented as a marine-grade metal nut in the embodiment). The flat-shaped structural member 11 of the rack body 1 includes two end supporting pieces 111 and a group of middle supporting pieces 112 in cooperation with a group of the connecting poles 15 and the nuts 16. Connecting holes 1111 are disposed on the two end supporting pieces 111, and clamping grooves 1121 are disposed on the middle supporting pieces 112. The connecting poles 15 are clamped into the clamping grooves 1121 of the middle supporting pieces correspondingly, and the two ends of the connecting poles 15 are fixed to the two end supporting pieces 111 by the nuts 16.

As shown in the schematic views of FIG. 6 to FIG. 9 illustrating the assembly of an airbag, an airbag bracket 17 is clamped on the rack body 1, a first clamping point 18 is formed on the rack body 1 at a place where the rack body 1 fits with the airbag, and a second clamping point 171 is disposed on the airbag bracket 17 at a place where the airbag bracket 17 fits with the airbag. The airbag 3 is clamped between the first clamping point 18 and the second clamping point 171 to limit the left and right movement of the airbag, a groove 31 is disposed on the airbag, and a fixing member 32 extending along the groove 31 fixes the airbag 3 to the rack bodies 1 and the airbag bracket 17 to limit the upward and downward movement of the airbag. Valves 33 are disposed on the two ends of the airbag 3, respectively. An adjusting structure 330 is disposed to the valve to adjust the air volume in the airbag. The adjusting structure 330 is an adjusting knob 331 buckled with the valve without falling off. The air volume in the airbag is adjusted by turning the adjusting knob.

Figure 10:
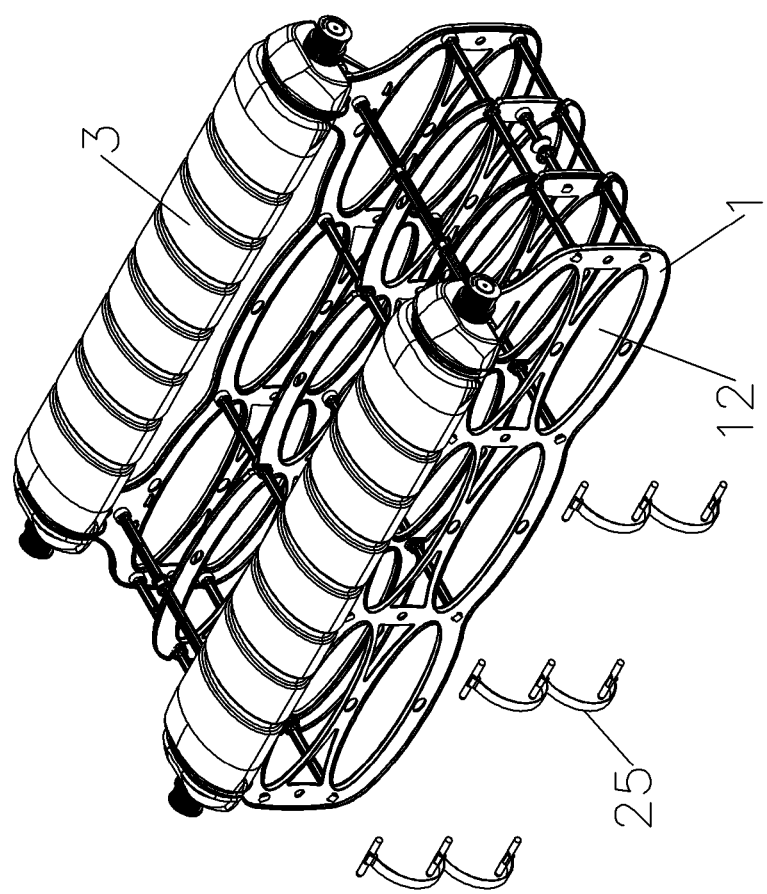
FIG. 10 is a first schematic view of disposing mesh bags on a rack body of the invention.
Figure 11:
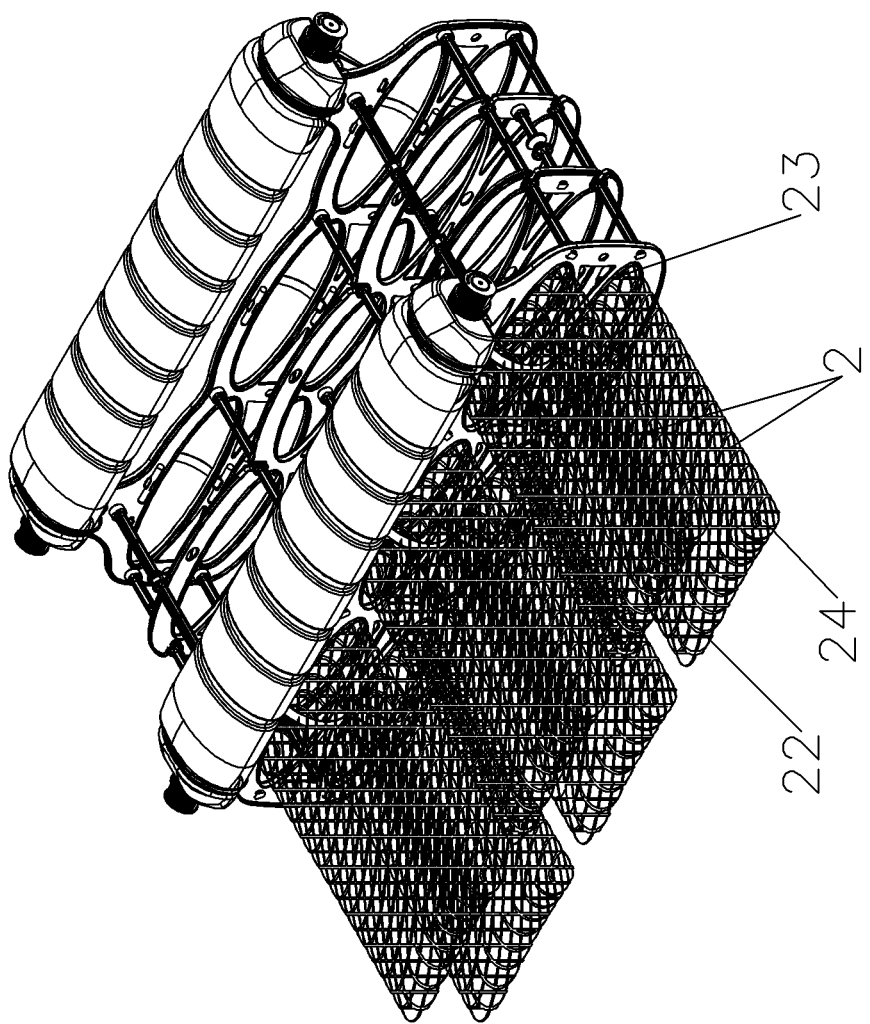
FIG. 11 is a second schematic view of disposing mesh bags on a rack body of the invention.
Figure 12:
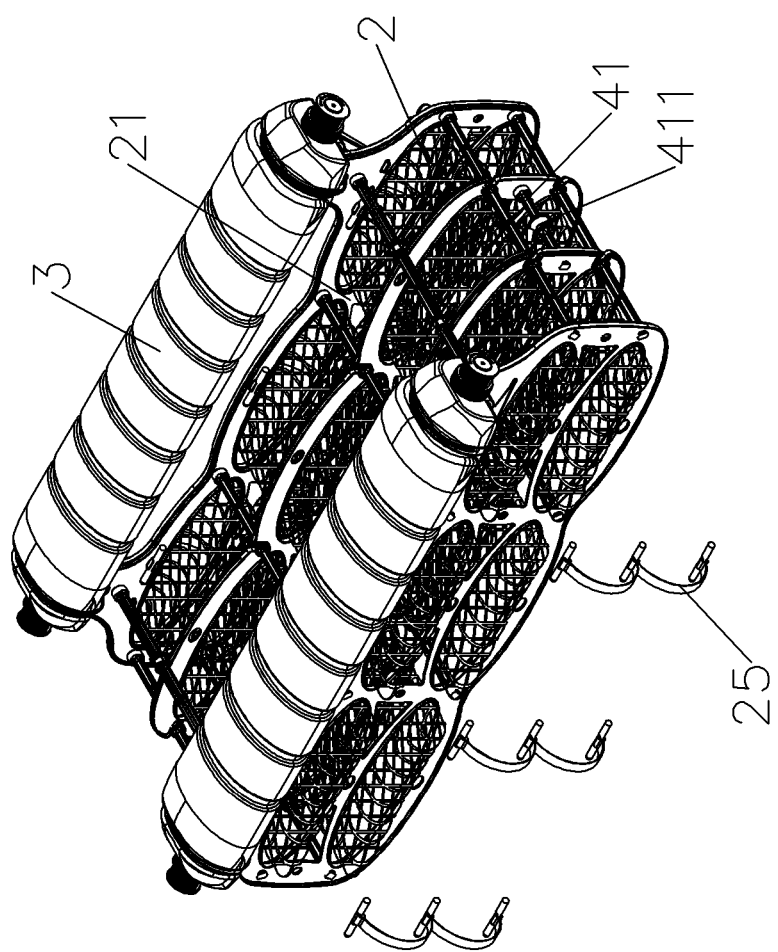
FIG. 12 is a third schematic view of disposing mesh bags on a rack body of the invention.
Figure 13:
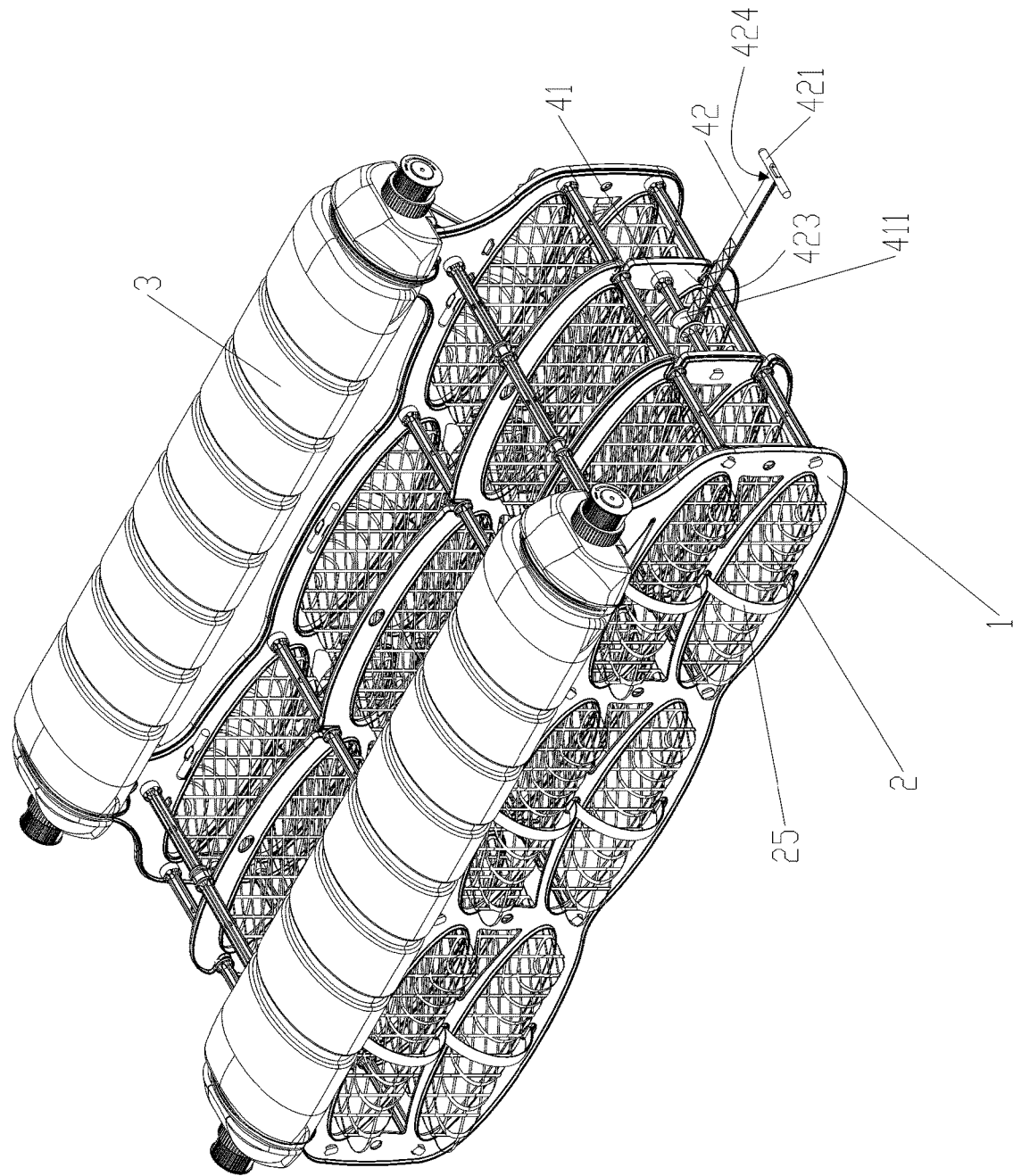
FIG. 13 is a first schematic view of the connection between rack bodies of the invention.
Figure 14:
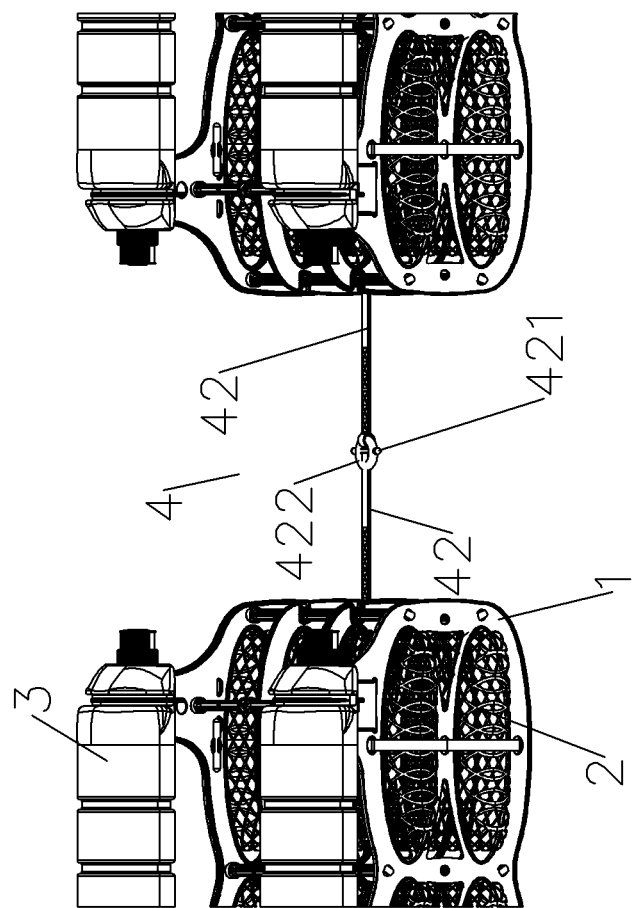
FIG. 14 is a second schematic view of the connection between rack bodies of the invention.
Figure 15:
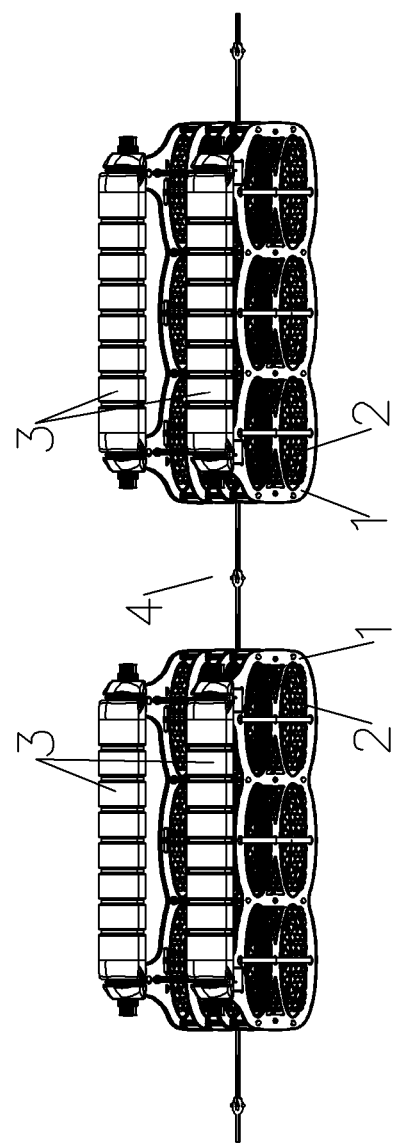
FIG. 15 is a third schematic view of the connection between rack bodies of the invention.
Figure 16:
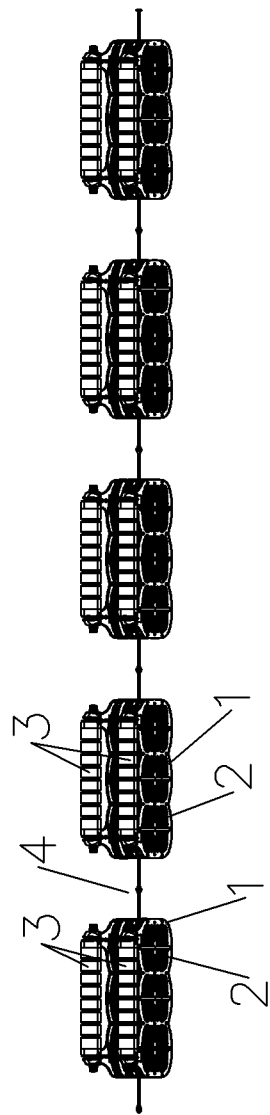
FIG. 16 is a fourth schematic view of the connection between rack bodies of the invention.

FIG. 10 to FIG. 12 are schematic views of the assembly of the mesh bags 2. There are multiple mesh bags 2 disposed and fixed in the accommodation spaces 12 of the rack bodies 1. There are spaces 21 for movement between the mesh bags, and the mesh bags 2 are fixed or disposed in a moveable manner.

In the embodiment, the mesh bags 2 are disposed in a movable manner. In the embodiment, the mesh bags 2 are pillow-type structures with one closed end 22 and one open end 23. Both end portions of the mesh bags 2 have a certain height to reserve spaces 24 for movement to prevent shellfish from getting stuck in the end portions. The mesh bags can be movable independent structures, disposed into the accommodation spaces 12 of the rack body, respectively, and positioned by a pull rod member 25. The mesh bags can also be movable independent structures, disposed into the accommodation spaces of the rack body, and fixed to the rack body by a fixing member. The structure of the fixing member is as follows: a group of connecting holes A are formed on each of the connecting poles, and the mesh bags are fitted on the rack body by the holding strap (the structure is illustrated in the embodiment of the drawings).

As shown in the schematic views of FIG. 13 to FIG. 16 illustrating a connecting structure between the rack bodies of the invention, the rack bodies are flexibly connected by a connecting structure 4, the connecting structure 4 includes connecting rods 41 fixed on two sides of each rack body, and a position-limiting groove 411 is formed on each of the connecting rods. One end 423 of a holding strap 42 is connected within the position-limiting groove of each of the connecting rods, and the other end 424 thereof is disposed with a sleeve rod 421 or a sleeve ring 422. The holding strap with the sleeve rod 421 is disposed on one side of the rack body, the holding strap with the sleeve ring 422 is disposed on the other side of the rack body, the sleeve ring 422 on one side of one rack body is connected to the sleeve rod 421 of another rack body, and the sleeve rod 421 on the other side of the rack body is connected to the sleeve ring 422 of the next rack body so that the rack bodies are flexibly connected to one another in sequence.

In the invention, after the configuration, the structure is configured to be put into the aquaculture region. The rack bodies and members are made of corrosion resistant and rust resistant materials (e.g., plastic or aluminum alloy), which are not easy to corrode and prolong the service life to at least 20 years, in general. The rack bodies are formed by splicing flat-shaped members through bolts and are disassembled into sheet-like stacks and multiple accessories when in transportation and in storage. The accessories can be put into the airbag without taking up spaces, and it is convenient for transportation and storage.

When the airbags have flat-shaped structures, the rack bodies sink under the water surface, and only a small part of the airbag is exposed above the water surface. Visual pollution is reduced, good stability is obtained, and the rack bodies are not easy to tilt. The airbag and the valve can be made into an inseparable structure, the valve is not easy to lose, and the air volume of the airbag can be quickly adjusted through the valve, so that the net cage can float at the optimal height for aquaculture.

The mesh bag is a movable structure, which can be placed in a stack when in transportation. There are two options for configuring the structure according to requirements. In the first structure, the mesh bag is fixed to the rack body by the pull rod member and when the products are required to be taken out, by pulling the pull rod member, the mesh bag is taken out from the rack body and then the aquaculture products inside the mesh bag are poured out. In the second structure, the mesh bag is disposed and fixed to the rack body by the fixing member and when the products are required to be taken out, without removing the mesh bag, the aquaculture products inside the mesh bag are poured out by just opening all the mesh bags. The mesh bag has good adaptability and can replace the common mesh bags on the market.

There are movement spaces between the rack bodies and the mesh bags, and there are also flow spaces reserved in the rack bodies. The fluidity thereof can increase the content of algae in the mesh bag, ensuring that the mesh bags have movement spaces on the rack bodies when wind is strong and waves are huge, ensuring that the products of the mesh bag can be evenly distributed in the mesh bags at all times and are naturally washed by the waves to polish the appearance of the products, and ensuring that the meat of the products is fresh and delicious, the manual opening process of the shellfish is reduced, and the aquaculture cost is decreased.

The rack bodies are connected by a sleeve ring in cooperation with a sleeve rod in a firm manner and with good adaptability. Multiple rack bodies can be connected at will, which can replace the existing connecting ropes to ensure that the rack bodies can be flipped easily and are placed in the same water. In addition, the cooperation of the sleeve ring and the sleeve rod can reduce the friction of the fit, achieves quick disassembly and assembly, and is not prone to break.

The airbag and the rack bodies are fixed by a positioning structure in a firm and stable manner without moving relative to each other.

The structure of the invention can achieve that it is already a single shellfish when being cultured in a mesh bag, and it is single from cultivation to maturity, achieving single shellfish aquaculture, and greatly improving the survival rate of the cultured products. When the cultured products are harvested, it requires only to take out the single shellfish in the mesh bag, reducing labor costs.

The flat-shaped structural members of the rack bodies are connected by connecting poles, the middle supporting pieces are clamped with the connecting poles through the clamping grooves, and the two end supporting pieces are locked and connected to the connecting poles by bolts. This structure is easy to disassemble, and the parts where the connecting poles are connected to the clamping grooves can increase the intensity.

The method for fixing the airbag adopts the connection method of the clamping points and the belt. The first clamping point and the second clamping point limit left and right movement of the airbag, and the belt limits upward and downward movement of the airbag. Fixation of the airbag by such cooperation of the clamping points and the belt is more stable and not easy to loosen.

When encountering extreme weather, by the structure of the invention, both valves at two ends of the airbag can be quickly open, so that the culture rack can quickly sink to a designated depth of the water, preventing the damage brought by wind and waves. In normal times, by adjusting the valves, the airbag air inflow and water inflow can be adjusted to implement the sinking of the culture rack to the designated depth of the water.

The foregoing description illustrates and describes the preferred embodiment of the invention. As mentioned, it should be understood that the invention is not limited to the embodiment disclosed herein and should not be regarded as an exclusion of other embodiments. The invention can be used in other various combinations, modifications and environments and can be modified through the foregoing teachings or technology or knowledge in related fields within the scope of the inventive concept described herein. The modifications and changes made by those skilled in the art without departing from the spirit and scope of the invention should fall within the protection scope of the following claims of the invention.

What is claimed is:

1. A single-seed shellfish floating aquaculture system, comprising rack bodies, mesh bags, and floats cooperating with one another, wherein the rack bodies, the mesh bags, and the floats are split structures, and are able to be assembled into a whole, wherein each of the rack bodies is made of corrosion resistant and rust resistant materials, each of the rack bodies is assembled from a group of detachable flat-shaped structural members, a plurality of accommodation spaces are formed in each of the assembled rack bodies, the mesh bags are disposed within the accommodation spaces, the floats are fixed on each of the rack bodies, and single shellfish seedlings are adapted to be directly put into the mesh bags,
wherein each floating aquiculture system has two holding straps, each holding strap comprises two ends, the rack bodies are flexibly connected by a connecting structure, the connecting structure comprises connecting rods fixed on two sides of each rack body, a position-limiting groove is formed on each of the connecting rods, one end of each holding strap is connected within the position-limiting groove of each of the connecting rods, and the other end of each holding strap is provided with a sleeve rod or a sleeve ring, wherein the holding strap with the sleeve rod is disposed on one side of the rack body, the holding strap with the sleeve ring is disposed on the other side of the rack body, the sleeve ring on one side of one rack body is connected to the sleeve rod of another rack body, and the sleeve rod on the other side of the rack body is connected to a sleeve ring of a next rack body so that two adjacent rack bodies are flexibly connected.

2. The single-seed shellfish floating aquaculture system according to claim 1, wherein each of the floats is an airbag.

3. The single-seed shellfish floating aquaculture system according to claim 2, wherein flow spaces are provided in each of the rack bodies.

4. The single-seed shellfish floating aquaculture system according to claim 3, wherein a number of the mesh bags are provided, the mesh bags are disposed and fixed in the accommodation spaces of the rack bodies, a movement space is reserved between the adjacent mesh bags, and the mesh bags are disposed in a fixed or movable manner.

5. The single-seed shellfish floating aquaculture system according to claim 4, wherein each of the mesh bags is a pillow-type structure having a closed end and an open end.

6. The single-seed shellfish floating aquaculture system according to claim 5, wherein each of the mesh bags is a movable independent structure, the mesh bags are respectively disposed into the accommodation spaces of each of the rack bodies, and are respectively positioned by pull rod members.

7. The single-seed shellfish floating aquaculture system according to claim 5, wherein each of the mesh bags is a movable independent structure, the mesh bags are respectively disposed into the accommodation spaces of each of the rack bodies, and are fixed to each of the rack bodies.

8. The single-seed shellfish floating aquaculture system according to claim 1, wherein a group of connecting holes are formed on each of the connecting poles, the holding straps penetrate the connecting holes and fit the mesh bags on the rack body.

9. The single-seed shellfish floating aquaculture system according to claim 2, wherein valves are respectively disposed on two ends of the airbag, and an adjusting structure is disposed on each valve to adjust an air volume in the airbag, the adjusting structure is an adjusting knob buckled with the valve, and the air volume in the airbag is able to be adjusted by turning the adjusting knob.

10. The single-seed shellfish floating aquaculture system according to claim 9, wherein each of the flat-shaped structural members of the rack body comprises two end supporting pieces and a group of middle supporting pieces in cooperation with a group of connecting poles and nuts, connecting holes are disposed on each end supporting piece, clamping grooves are disposed on each middle supporting piece, each connecting pole is clamped into the clamping grooves of the middle supporting pieces, and two ends of each connecting pole are respectively fixed to the two end supporting pieces by the nuts.

11. The single-seed shellfish floating aquaculture system according to claim 2, wherein each of the flat-shaped structural members of the rack body comprises two end supporting pieces and a group of middle supporting pieces in cooperation with a group of connecting poles and nuts, connecting holes are disposed on each end supporting piece, clamping grooves are disposed on each middle supporting piece, each connecting pole is clamped into the clamping grooves of the middle supporting pieces, and two ends of each connecting poles are respectively fixed to the two end supporting pieces by the nuts.

12. The single-seed shellfish floating aquaculture system according to claim 11, wherein an airbag bracket is disposed on each rack body, a first clamping point is formed on the rack body at a place where the rack body fits with the airbag, a second clamping point is disposed on the airbag bracket at a place where the airbag bracket fits with the airbag, the airbag is clamped between the first clamping point and the second clamping point to limit left and right movement of the airbag, a groove is disposed on the airbag, and a fixing member extending along the groove fixes the airbag to the rack body and the airbag bracket to limit upward and downward movement of the airbag.

* * * * *